United States Patent [19]

Fukui et al.

[11] Patent Number: 5,055,750
[45] Date of Patent: Oct. 8, 1991

[54] AIR DAMPER OPERATING SYSTEM OF VEHICLE AIR CONDITIONERS

[75] Inventors: Takashi Fukui; Hironobu Kawai, both of Aichi, Japan

[73] Assignee: Asmo Co., Ltd., Kosai, Japan

[21] Appl. No.: 587,849

[22] Filed: Sep. 25, 1990

[30] Foreign Application Priority Data

Sep. 28, 1989 [JP] Japan .............................. 1-114087[U]
Oct. 3, 1989 [JP] Japan .................................. 1-258520

[51] Int. Cl.[5] ............................................. H02P 1/00
[52] U.S. Cl. ..................................... 318/254; 318/116
[58] Field of Search .......................... 310/51, 323, 316; 318/138, 139, 439, 114, 118, 119, 116, 254, 254 A

[56] References Cited

U.S. PATENT DOCUMENTS

| | | | |
|---|---|---|---|
| 4,842,387 | 6/1989 | Murakami et al. .................. | 350/429 |
| 4,914,336 | 4/1990 | Yamasaki ........................... | 310/316 |
| 4,915,074 | 4/1990 | Arai . | |
| 4,936,307 | 6/1990 | Saito et al. ............................... | 128/4 |
| 4,989,030 | 1/1991 | Naka et al. ........................... | 354/435 |
| 4,991,957 | 2/1991 | Sakamoto et al. ................... | 356/241 |

FOREIGN PATENT DOCUMENTS 1-232128 9/1989 Japan .

Primary Examiner—William M. Shoop, Jr.
Assistant Examiner—A. Jonathan Wysocki
Attorney, Agent, or Firm—Burns, Doane, Swecker & Mathis

[57] ABSTRACT

An air damper operating system for vehicle air conditioners with a plurality of ultrasonic motors. An oscillator circuit, phase shifter and feedback circuit control the frequency of an oscillator of a motor. A feedback signal transfer switch, position sensors and a time-division switching circuit operate the motors until they are rotated to predetermined positions.

1 Claim, 7 Drawing Sheets

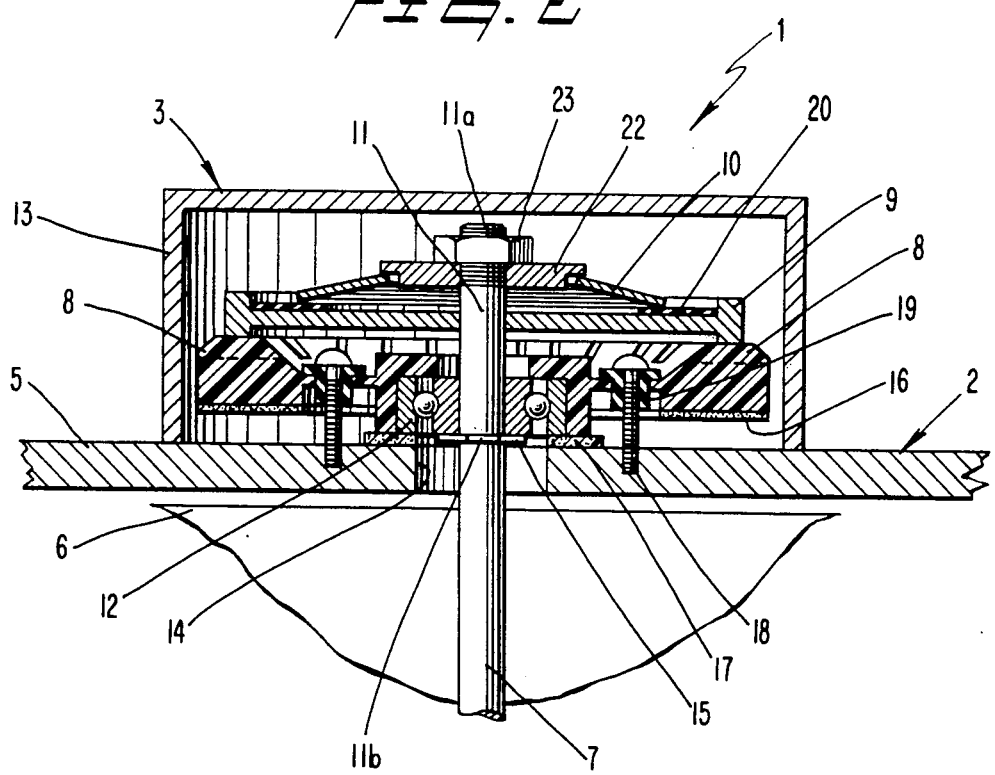
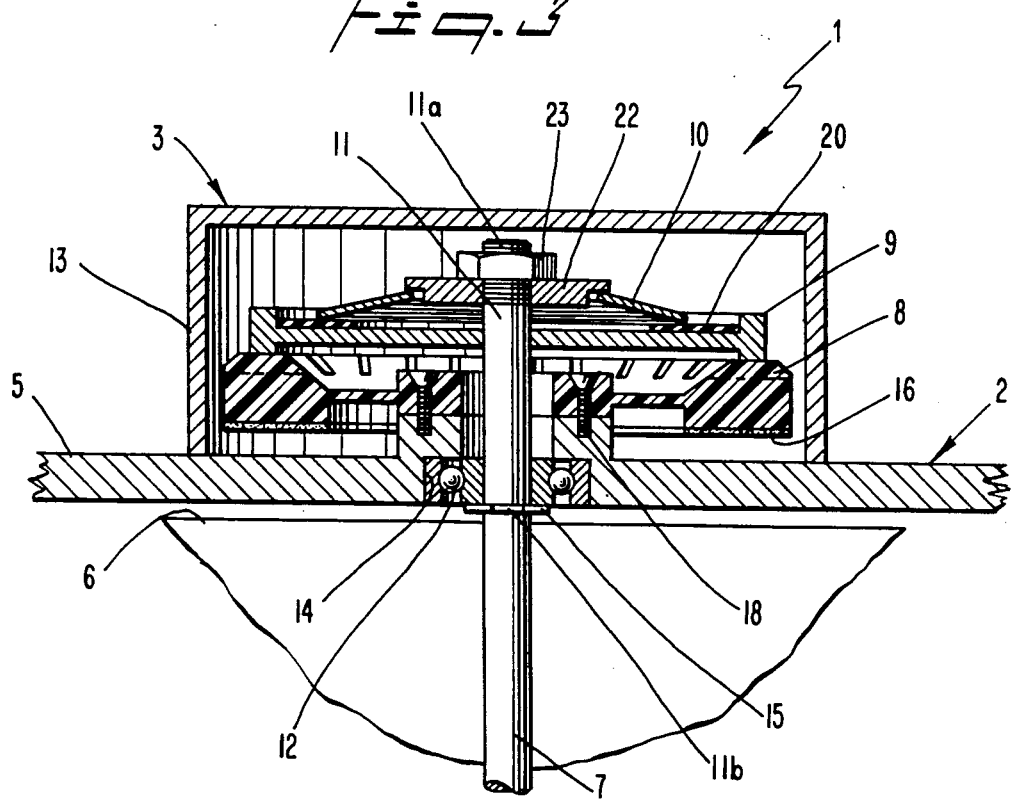

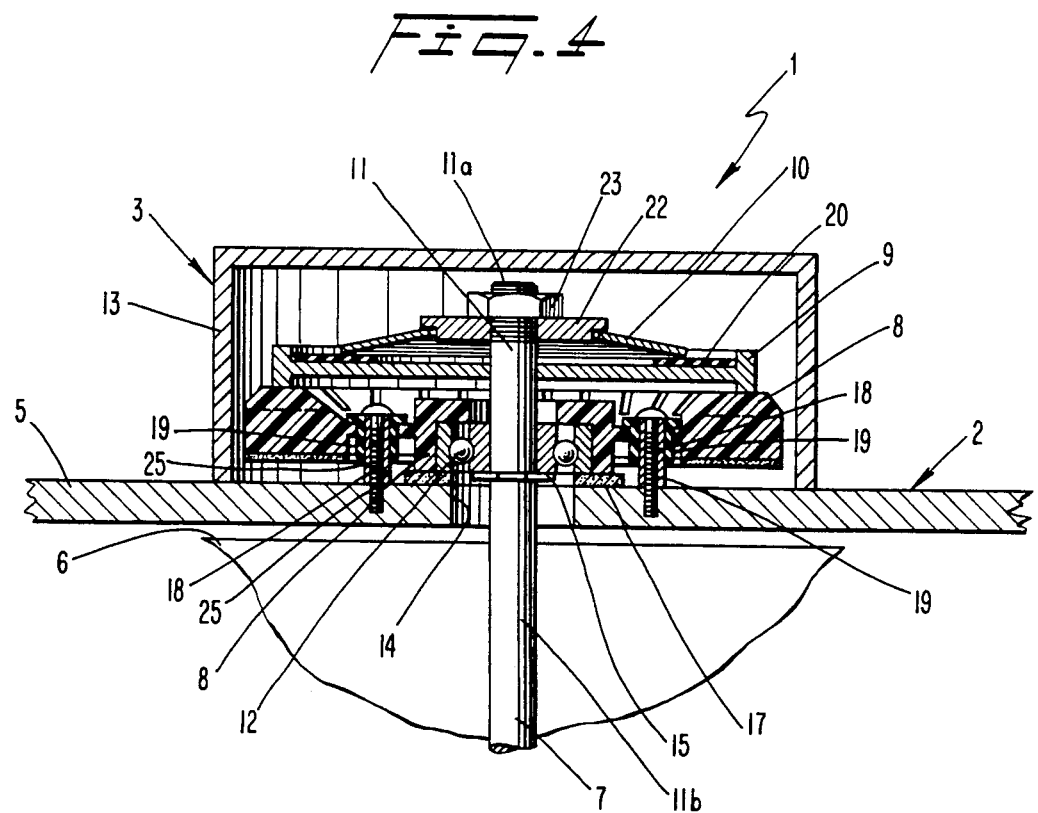
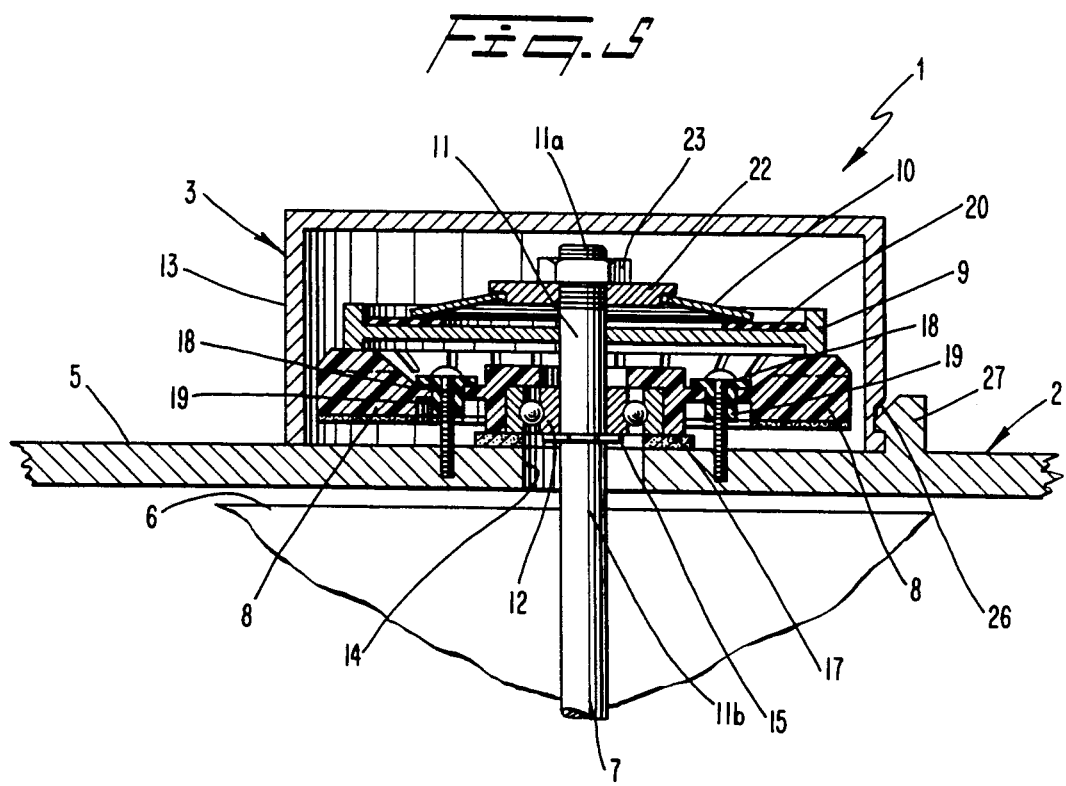

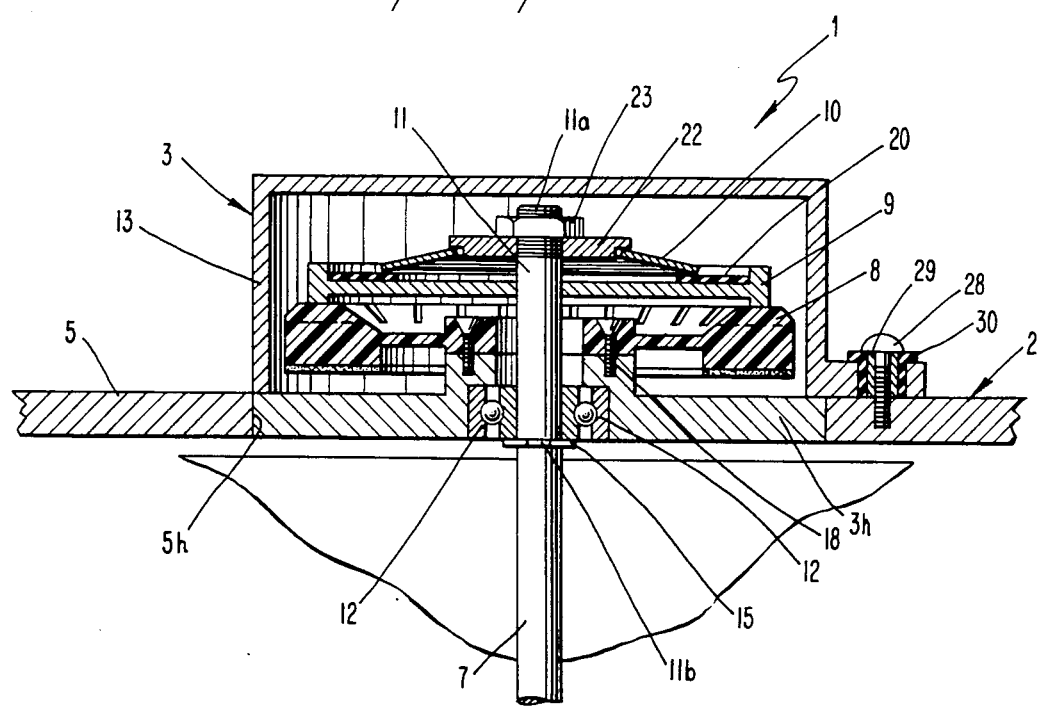
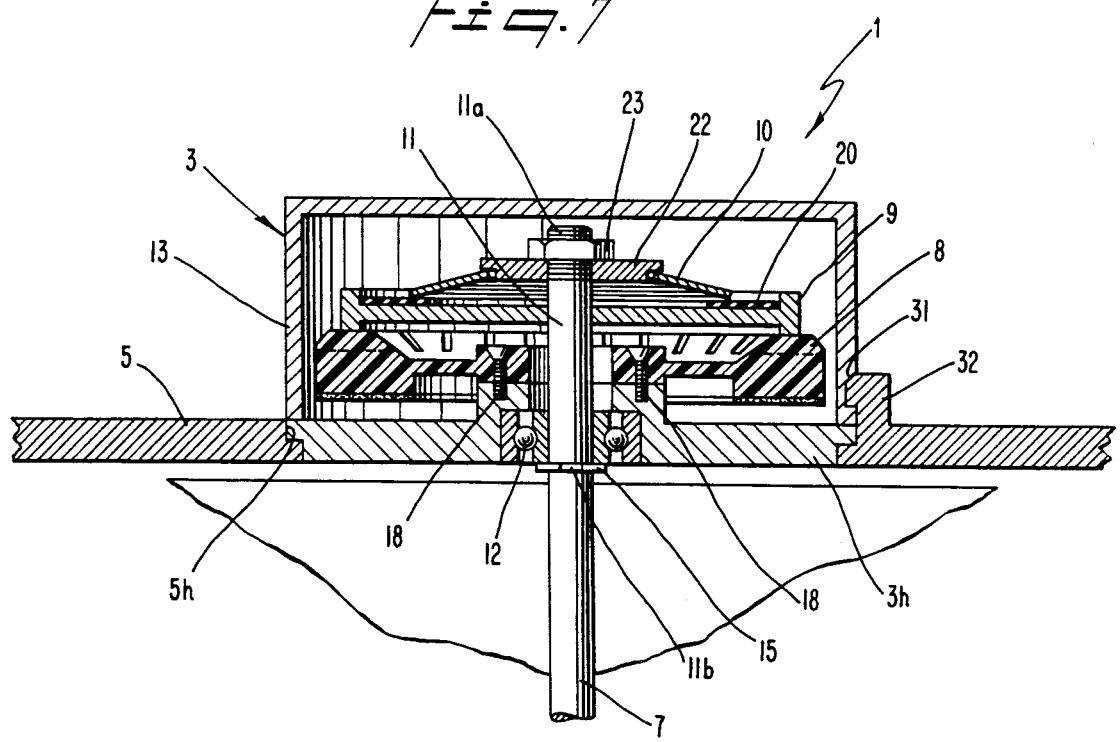

Fig. 9
| S1 | S2 | S3 | A | B | 17 | 18 | 3a | 3b | 3c |
|----|----|----|---|---|-----|-----|----|----|----|
| H | L | L | L | L | OFF | OFF | 0 | X | X |
| L | H | L | H | L | ON | ON | X | 0 | X |
| L | L | H | H | H | ON | ON | X | X | 0 |
L ---- 0V  0 ---- WORKING
H ---- +Vcc  X ---- NONWORKING
Fig. 10
MOTOR 3a FINISHES WORKING
P1
S1
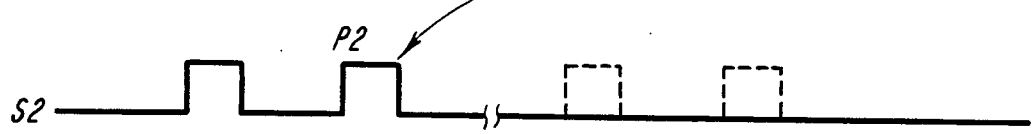
MOTOR 3b FINISHES WORKING
P2
S2
MOTOR 3c FINISHES WORKING
P3
S3

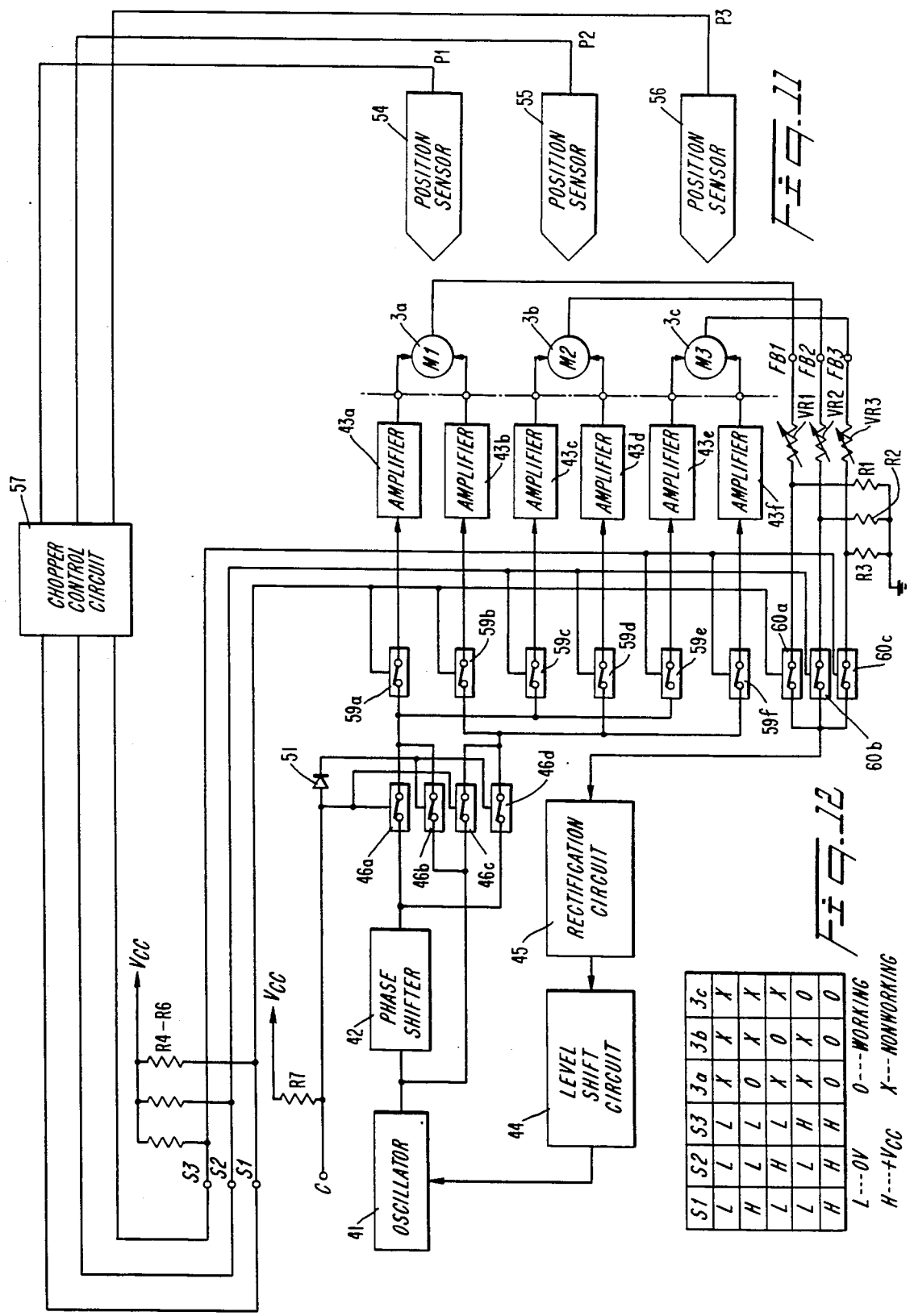

AIR DAMPER OPERATING SYSTEM OF VEHICLE AIR CONDITIONERS

BACKGROUND OF THE INVENTION

This invention relates to an air damper operating system of vehicle air conditioners for automobiles and the like and more particularly to an air damper operating system of vehicle air conditioners whose air damper is operated by a rotary type ultrasonic motor.

An ultrasonic motor is coming into practical use in recent year, as an application of a piezoelectric element (hereinafter referred to as PZT) which becomes an origin of an ultrasonic oscillation. A rotary type ultrasonic motor which is a kind of the above ultrasonic motors is constituted by pushing a moving body serving as a rotor to an elastic body serving as a stator which has PZT plastered on its back side with a predetermined pushing pressure by a spring member, inputs into said PZT an alternating current signal whose phase is 90 degrees different from that of said PZT, generates on said elastic body traveling oscillatory waves under the piezoelectric effect of PZT, and operates to revolve said moving body with said traveling oscillatory waves.

Because the revolving speed of the rotary type ultrasonic motor is slower than that of the motor heretofore in use and, in addition, its torque is large, any speed reduction means is unnecessary. Furthermore, because it has holding power when it stops, to is putting to use for an air damper operating system which operates an air damper of vehicle air conditioners for automobiles and the like, such as that indicated in Japanese Utility Model Koho No. 64-24609.

However, the structure of installing the ultrasonic motor was not indicated concretely in the air damper operating system of vehicle air conditioners indicated in the above Japanese Utility Model Koho No. 64-24609.

An operating circuit is necessary to operate an ultrasonic motor, and so an ultrasonic motor and its operating circuit are constituted as a pair.

On that account, for example, in case of an operating system which uses several ultrasonic motors to switch several air dampers of vehicle air conditioners, several operating circuits have to be used. Then, it leads to such a lot of problems that its cost is high and ultrasonic motors cannot be used in a limited space and ultrasonic motors and their operating circuits have to be installed apart from each other.

Heretofore, Japanese Utility Model Koho No. 63-131596 indicates an operating system with several ultrasonic motors which is provided with a switching means to transmit a cycle signal generated from a signal generation means alternatively either to an elastic body of the first ultrasonic motor or to an elastic body of the second ultrasonic motor. However, because the operating system heretofore in use operates the first or second ultrasonic motor alternatively, one ultrasonic motor rotates to a predetermined position an then, another ultrasonic motor rotates to its predetermined position. In consequence, there was such a problem that their simultaneous working could not be done in the same way as two ultrasonic motors were operated by two operating circuits respectively.

SUMMARY OF THE INVENTION

An object of this invention is to provide an air damper operating system of vehicle air conditioners with the reduced number of parts.

Another object of this invention is to provide an air damper operating system of vehicle air conditioners wherein almost simultaneous working can be done by one operating circuit in the same way as several ultrasonic motors are operated by several operating circuits respectively.

An air damper operating system of vehicle air conditioners in order to achieve the above objects comprises an air damper operating system of vehicle air conditioners whose air damper is operated by a rotary type ultrasonic motor, an end portion of a revolving axis wherein said air damper is adhered in one united body with a shaft of an ultrasonic motor, and a part of a case body of said vehicle air conditioners serving as a part of a shell of the ultrasonic motor.

In an air damper operating system of vehicle air conditioners by this invention constituted as above mentioned, an end portion of a rotary axis wherein an air damper is adhered serves as a shaft of an ultrasonic motor and an exclusive shaft member is omitted in an ultrasonic motor itself. Thus, the number of parts is reduced.

Moreover, a part of a case body of vehicle air conditioners serves as a part of a shell member of an ultrasonic motor. Though a shell member of a motor is generally constituted by several members, a case body of vehicle air conditioners serves as a part of several members and so, the number of parts is reduced.

Thus, according to another object of this invention, an air damper operating system of vehicle air conditioners for automobiles whose air damper is operated by an ultrasonic motor is provided, comprising an oscillator generating an alternating current signal in an operating circuit, a phase shifter shifting this alternating current signal, a feedback means controlling a frequency of an alternating current signal of an oscillator by a feedback signal of an ultrasonic motor, a revolving direction transfer switch means capable of transferring an output signal from said oscillator and phase shifter in both normal and reverse directions in response to an input signal, a switching supply means containing a motor transfer switch and an amplifier capable of switching output signals of said oscillator and phase shifter via said revolving direction transfer switch means to several ultrasonic motors so as to supply with, a feedback signal transfer switch means capable of switching feedback signals from said ultrasonic motors to said feedback means so as to supply with, position sensors provided for said ultrasonic motors respectively and generating position signals when said ultrasonic motors are rotated to the predetermined positions, and a time-division switching means generating a time-division pulse signal from when said ultrasonic motor starts revolving until said position sensor generates a position signal and working to switch said switching supply means and feedback signal transfer switching means.

According to the above constitution, an alternating current signal generating from one operating circuit and this shifted signal from said alternating current is provided time-divisionally for several ultrasonic motors via a normal-reverse transfer switch means and a transfer supply means. In consequence, several ultrasonic motors may be revolved for a short time at successive intervals by one operating circuit. Moreover, a feedback signal generated by an ultrasonic motor is returned via a feedback signal transfer switch means and a feedback means to an oscillator of said operating circuit. In consequence, a frequency of said oscillator may be changed, following up the change of the circumstance. And when several ultrasonic motors rotate to respective predetermined positions, a time-division pulse signal of a time-division switching means disappears in response to a position signal generating from a position sensor. In consequence, the several ultrasonic motors may be stopped with respective time lags.

Other and further objects, features and advantages of the invention will become appear more fully from the following description.

BRIEF DESCRIPTION OF THE DRAWINGS

FIG. 2 is a partially sectional view of an air damper operation system of said vehicle air conditioner.

FIG. 3 is a partially sectional view of an air damper operation system of vehicle air conditioners as the second embodiment of this invention.

FIG. 4 is a partially sectional view of an air damper operation system of vehicle air conditioners as the third embodiment of this invention.

FIG. 5 is a partially sectional view of an air damper operation system of vehicle air conditioners as the fourth embodiment of this invention.

FIG. 6 is a partially sectional view of an air damper operation system of vehicle air conditioners as the fifth embodiment of this invention.

FIG. 7 is a partially sectional view of an air damper operation system of vehicle air conditioners as the sixth embodiment of this invention.

Figures from FIG. 8 to FIG. 10 show the seventh embodiment FIG. 9 is a chart showing the relation between a time-division pulse signal and a working of several ultrasonic motors. FIG. 10 is a timing chart of a time-division pulse signal.

FIG. 11 is a circuit diagram showing the eighth embodiment.

FIG. 12 is a chart showing the relation between a time-division pulse signal and a working of several ultrasonic motors.

DETAILED DESCRIPTION OF THE PREFERRED EMBODIMENTS

Figure 1A:
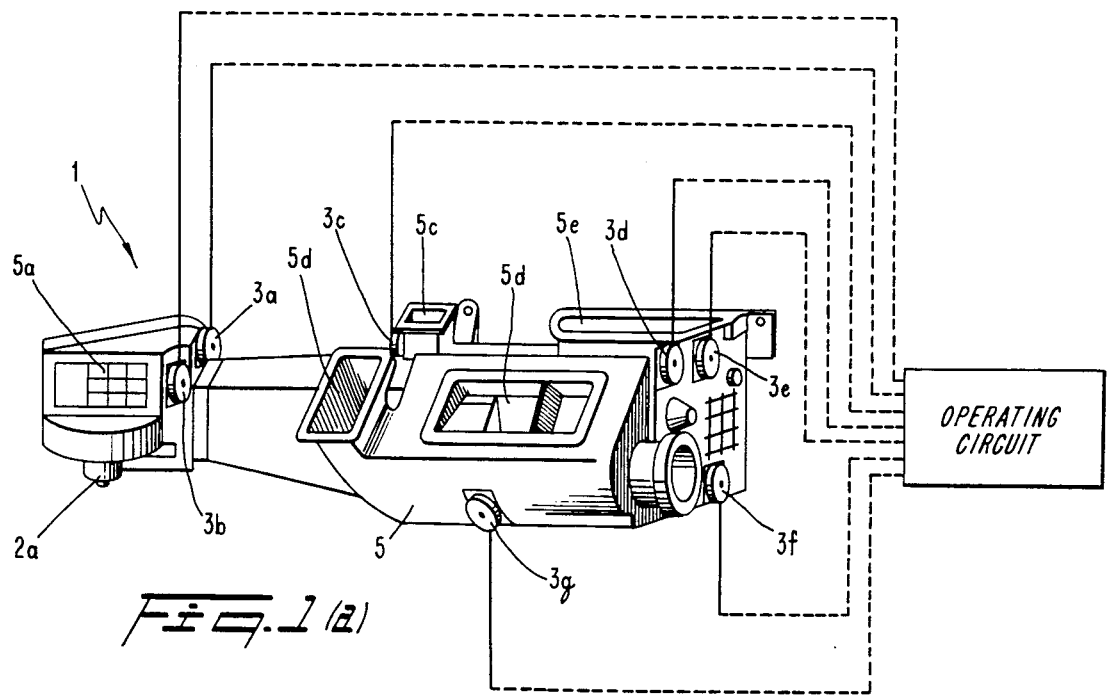
FIG. 1(a) is an outlined, constitutional and diagonal view of a vehicle air conditioner as an embodiment of this invention.
Figure 1B:
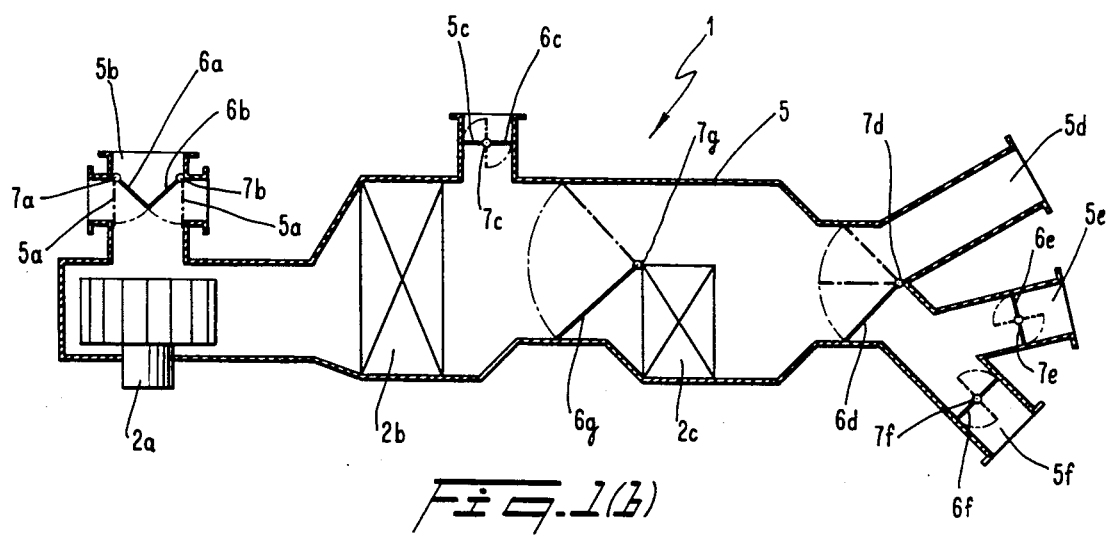
FIG. 1(b) is an outlined and constitutional view for explanation of said vehicle air conditioner.

The embodiments of this invention will be explained on the basis of the drawings hereinafter. FIG. 1(a) and (b) show an outlined constitution of a vehicle air conditioner. The vehicle air conditioner 1 is provided with the blower 2a, the evaporator 2b, the heater core 2c, the seven ultrasonic motors 3a-3g and the operating circuit 4 of said ultrasonic motors 3a-3g. The vehicle air conditioner 1 has the blower 2a, the evaporator 2b, the heater core 2c and the like built-in in the inside of the case body 5 formed with intricate air paths. As shown mainly in FIG. 1(b), the intake of the internal air 5a, the intake of the external air 5b, the face blowing outlet 5c, the vent outlet 5d, the defroster outlet 5e and the heat outlet 5f are open in the case body 5. Moreover, the internal-external air switching dampers 6a, 6b, the mode dampers 6c-6f to transfer outlets, and the air mix damper 6g are provided in said air path. These dampers 6a-6g are adhered to the respective axes 7a-7g supported rotatably in the case body 5.

The internal-external air switching dampers 6a, 6b switch over an internal air to an external air or vice versa going toward the blower 2. The mode dampers 6c-6f control the amount of air blown out of each outlet 5c-5f and make it possible to select the desired outlet mode. The air mix damper 6g changes the ratio between the air passing through the heater core 2c and the air going through a bypass road of the heater core 2c out of the cooled air passing through the evaporator 2b and controls the temperature of the air going toward the each outlet 5d-5f.

As shown in FIG. 1(a), the seven ultrasonic motors 3a-3g assembled on the outer surface of the case body 5 are supplied with the operation current by the operation circuit 4 and rotate. The operation circuit 4 is to operate the several ultrasonic motors 3a-3g to the desired revolving positions simultaneously or in turn.

Next, FIG. 2 shows the installing structure of the ultrasonic motors operating each air damper. Further, the installing structure of the seven ultrasonic motors, shown in FIG. 1(a), is roughly equal.

The ultrasonic motor 3 is constituted by pushing the moving body 9 to the elastic body 8 by the dished end spring 10 serving as the spring member with a predetermined pushing pressure. The shift 11 of the ultrasonic motor 3 is supported revolvably in the central portion of the elastic body 8 by the ball bearing 12. The end portion of the shaft 11 is provided with the male screw portion 11a. One end portion of the rotary axis 7 serves as the shaft 11. The cover 13 and a part of the case body 5 of vehicle air conditioners form the shell member of the ultrasonic motor 3. The hole 14 penetrating the shaft 11 is bored in the case body 5. The shaft 11 is provided with the ring groove 11b in a slightly upper position of the hole 14.

Next, as a working of the first embodiment, the assembly of the ultrasonic motor into a vehicle air conditioner will be explained on reference mainly to FIG. 2.

The inside of the case body 5 is provided with the rotary axis 7 and the air damper 6 adhered to this rotary axis 7. The lower end portion of the rotary axis 7 unshown in the figure is supported by the bearing shaft portion of the case body 5. The upper end portion of the rotary axis 7 serving as the shaft 11 of the ultrasonic motor 3 is projecting from the hole 14. The snap ring 15 is fixed to the ring groove 11b of the shaft 11.

In order to assemble the ultrasonic motor 3 into the case body, the elastic body 8 is screwed into the body 5 to begin with. PZT 16 is plastered on the back side of the elastic body 8 and the ball bearing 12 is scarfed in the central portion of the elastic body 8. The shaft 11 is penetrated into the inside ring of this ball bearing 12. In case of screwing the elastic body 8, a plate type of the cushion member 17 is let lie between the elastic body 8 and the case body 5, and the rubber bush 19 is let lie between the elastic body 8 and the screw 18.

Next, each member, in the order of the rotor 9, the vibration-proof rubber 20, the dished end spring 10, the stop-bearing washer 22, is settled on the elastic body 8 and the nut 23 is fastened in the male screw portion 11a of the shaft 11. Then, the rotor 9 is pushed to the elastic body 8 with a predetermined pressure by the dished end spring 10.

Next, the assembly is finished by screwing the cover 13 into the case body 5.

According to the first embodiment of this invention, a plate type of the cushion member 17 lies between the elastic body 8 and the case body 5 and, in addition, the rubber bush 19 lies between the screw 18 and the elastic body 8. Therefore, distortion of the case body 5 is absorbed by the cushion member 17 and the rubber bush 19 and the elastic body 8 is not subject to the direct influence of said distortion. In general, the case body 5 expands and contracts sharply in response to the change of the temperature. Therefore, the stress in the thrust direction and in the radial direction is put mainly to the elastic body 8 of the ultrasonic motor 3 and the quality of the ultrasonic motor 3 may decrease. However, according to the first embodiment of this invention, the stress mainly in the thrust direction is absorbed by a plate type of the cushion member 17, and, in addition, the stress mainly in the radial direction is absorbed by the rubber bush 19. In consequence, there is an advantage that the quality of the ultrasonic motor 3 does not decrease.

This invention is not restricted in detail by the above first embodiment. For example, as shown in FIG. 3 of the second embodiment, the ball bearing 12 may be scarfed into the case body 5 and the shaft 11 may be supported by this ball bearing 12 and the elastic body 8 may be screwed into the case body 5 on the upper part of the ball bearing 12. Executed in this way, before the stage of the assembly of the ultrasonic motor 3, the shaft 11 is supported to the case body 5 in the predetermined position by the ball bearing 12 and is stable. In consequence, there is an advantage that especially the assembly working efficiency of the elastic body 8 becomes better at the assembly of the ultrasonic motor 3. Moreover, when the screwing positions of the elastic body 8 are let close to each other and so, the elastic body 8 is hard to be influenced by the expansion and contraction of the case body 5 according to the change of the temperature. As a result, even when the shock absorbers, such as a plate type of the cushion member 17 and the rubber bush 19, are omitted, mainly the elastic body 8 of the ultrasonic motor 3 can be protected from putting the stress in the thrust direction and in the radial direction. In consequence, there is an advantage that the quality of the ultrasonic motor 3 does not decrease.

In the third embodiment as shown in FIG. 4, a collar of metal material can be inserted between the screw 18 and the rubber bush 19 for screwing the elastic body 8 to the case body 5 with screws 18. In consequence, the dimensional accuracy of the distance between the elastic body 8 and the case body 5 and that of the screwing position can be improved.

Further, in the fourth embodiment as shown in FIG. 5, securing the cover 13 to the case body 5 may be performed by what is called snap fit, wherein a plurality of engaging indented portions 26 formed on the lower outside periphery of the cover 13 elastically engage with engaging hooks 27 formed on the case body 5. In this way, there is an advantage of improving the work efficiency because it is possible to secure the cover 13 faster than the way of screwing.

Further, in the fifth embodiment as shown in FIG. 6, the motor housing $3h$, on which the elastic body 8 of the ultrasonic motor 3 is screwed with screws 18 and the shaft 11 is rotatably supported through the ball bearing 12, is put in the fitting hole $5h$ formed in the case body 5. That is, the motor housing $3h$ which is a shell member of the ultrasonic motor serves as a part of the case body 5 of the vehicle air conditioner. And the cover 13 is screwed on the case body 5, and for the screwing a collar 29 of metal material and a rubber bush 30 are disposed between the screw 28 and the cover 13.

According to the fifth embodiment, since it is possible to assembly the ultrasonic motor in the set up condition to the case body 5, there is an advantage that the assembly work can be quickly carried out. Also, since securing the cover 13 is performed by screwing through the metal collar 29 and the rubber bush 30, the deformation of the cover 13 and case body 5 can be absorbed by the rubber bush 30 and the direct affection against the ultrasonic motor can be prevented.

Furthermore, in the sixth embodiment as shown in FIG. 7, securing the cover 13 to the case body 5 may be performed by what is called snap fit, as well as the fourth embodiment as shown in FIG. 5, wherein a plurality of engaging indented portions 31 formed on the lower outside periphery of the cover 13 elastically engage with engaging hooks 32 formed on the case body 5. Also in this way, there is an advantage of improving the work efficiency because it is possible to secure the cover 13 faster than the way of screwing.

As above mentioned, in the air damper operating system of vehicle air conditioners by this invention, an exclusive shaft member is omitted in an ultrasonic motor itself and, furthermore, a part of an exclusive shell member is omitted in an ultrasonic motor itself. In consequence, the number of parts decreases and this invention has such a good effect that it becomes possible to reduce the cost and weight sharply.

Next, this invention will be explained concretely on the basis of the seventh embodiment shown in figures from FIG. 8 to FIG. 10.

To begin with, FIG. 1($a$), ($b$) show the outlined constitution of a vehicle air conditioner using an ultrasonic motor operating system by this invention. The vehicle air conditioner 1 is provided with the blower 2, the evaporator $2b$, the heater core $2c$, the seven ultrasonic motors $3a$-$3g$ and one operating circuit 4 operating these ultrasonic motors $3a$-$3g$. Other constitutions of said vehicle air conditioner are the same as those in the first embodiment. Therefore, a detailed explanation will be omitted.

As shown in FIG. 1($a$), the seven ultrasonic motors $3a$-$3g$ assembled to the outer surface of the case body 5 are supplied with the operation current from one operation circuit 4 and rotate. The operation circuit 4 is to operate to move the several ultrasonic motors $3a$-$3g$ to the desired revolving positions almost simultaneously.

Figure 8:
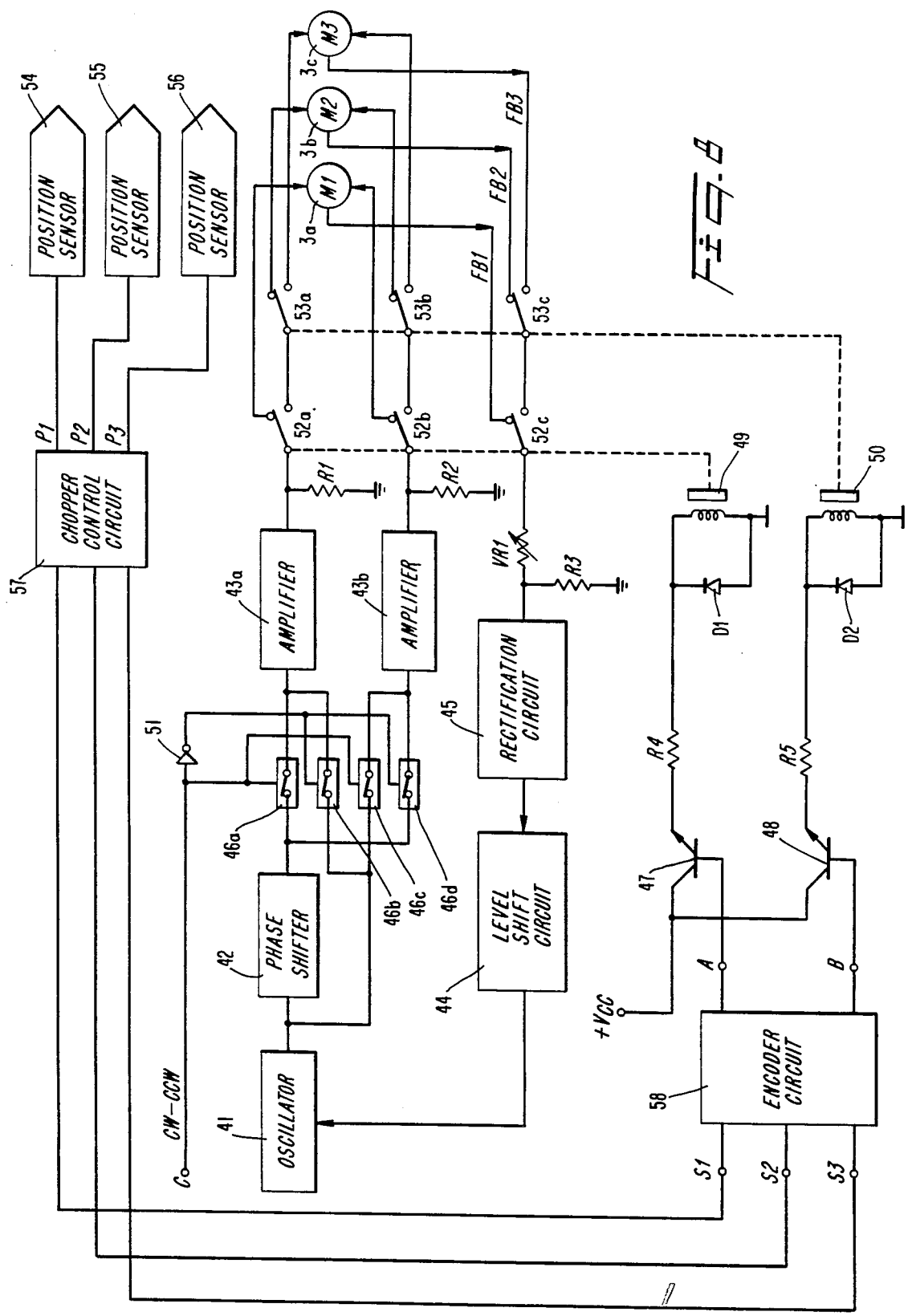
FIG. 8 is a circuit diagram.

As shown in FIG. 8, the operating system of the seventh embodiment has the oscillator 11 generating the alternating current in an ultrasonic wave region, the phase shifter 42 shifting this alternating current signal electrically by about 90 degrees, and the level shift circuit 44 and the rectification circuit 45 returning the oscillatory voltage of the ultrasonic motor $3a$-$3c$ to the oscillator 41, as one operation circuit. The revolving direction transfer switches $46a$-$46d$ are electric switches capable of transferring the revolving direction of the ultrasonic motors $3a$-$3c$ by transferring the output signals of the oscillator 41 and the phase shifter 42 in both normal and reverse directions. The revolving direction transfer switches $46a$ and $46c$ are connected with the signal terminal c and the revolving direction transfer switches $46b$ and $46d$ are connected with the signal terminal c via the NOT circuit 51. The amplifiers $43a$ and $43b$ amplify the signals supplied from the oscillator 41 and the phase shifter 42 via the revolving direction transfer switches 46a–46d. The motor transfer switches 52a, 52b, 53a and 53b are the triode relay contacts, transferring the output signals of the amplifiers 43a and 43b and supplying the respective ultrasonic motor 3a–3c with them. And the feedback signal transfer switches 52c and 53c are the triode relay contacts, transferring the feedback signals FB1–FB3 from the respective ultrasonic motors 3a–3c and supplying the rectification circuit 45 with them. The said transfer switches 52a, 52b and 52c are transferred from the normal-close contact to the normal-open contact by the switching control relay coil 49 and the transfer switches 53a, 53b and 53c are transferred from its normal-close contact side to its normalopen contact side by the switching control relay coil 50. The switching control relay coil 49 is fed with a current from the power source +Vcc when the transistor 47 continues electrified, and the switching control relay coil 50 is fed with a current from the power source +Vcc when the transistor 48 continues electrified.

The ultrasonic motors 3a–3c are provided with the position sensors 54–56 respectively in relation to the output axis, input the position signals $P_1$, $P_2$ and $P_3$ into the chopper control circuit 57, judge from the chopper control circuit 57 whether the respective motor axes of the ultrasonic motors 3a–3c stand in the predetermined positions or not, and control to change the time-division pulse signals S1–S3 to L when the position signals $P_1$, $P_2$ and $P_3$ generate. The encoder circuit 58 outputs the low level L (OV) signal and/or the high level H (+Vcc) signal to the signal terminals A, B and controls on-off of the transistor 47 and 48 so as to work any of the motors 3a–3c selected by the combination of the pulse signals S1–S3. Further, in FIG. 1, R1–R5 are the resistors and $D_1$, $D_2$ are the diodes and VR1 is a variable resistor.

The working of the embodiment according to the above constitution will be explained on the basis of the figures from FIG. 8 to FIG. 10. FIG. 9 is a chart showing the relation between the pulse signals S1–S3 and the working and stop of the ultrasonic motors 3a–3c and, in addition, the relation between the signal conditions of the signal terminals A, B and on-off of the transistors 47 and 48.

The alternating current signal from the oscillator 41 shifted electrically by 90 degrees by the phase shifter 42 and the signal from this oscillator 41 and the signal from the phase shifter 42 are supplied for the amplifier 43a, 43b via the revolving direction transfer switches 46a–46d. For example, in the case where the signal input into the signal terminal c is the high level (H), the signal of H (+Vcc) is input into the transfer switches 46a–46c. In consequence, these switches 46a–46c continue electrified and the signal of the phase shifter 42 is supplied for the amplifier 43 via the switch 46a and the signal of the oscillator 41 is supplied for the amplifier 43b via the switch 46c. On the contrary, in the case where the signal of the signal terminal c is L (OV), the H signal is input into the transfer switches 46b and 46d via the NOT circuit 51. In consequence, these switches 46b and 46d continue electrified and the signal of the phase shifter 42 is supplied for the amplifier 43b via the switch 46d and the signal of the oscillator 41 is supplied for the amplifier 43a via the switch 46b.

The output signals of the amplifiers 43a and 43b are transferred by the motor transfer switches 52a, 52b, 53a and 53b and operate the ultrasonic motors 3a–3b. The said motor transfer switches 52a, 52b, 53a and 53b work the transistors 47, 48 and the switching control relay coil 49, 50 and are controlled to switch, depending upon whether the signal input into the signal terminals A and B is L or H. For example, in the case where both signal terminals A, B are L, the conditions of both transistors 47 and 48 are off and said relay coil 49 and 50 do not work. In consequence, the motor transfer switches 52a, 52b, 53a and 53b and, in addition, the feedback signal transfer switches 52c, 53c do not work and the output from the amplifiers 43a and 443b is supplied for the ultrasonic motor 3a. At this time, the feedback signal FB1 from this motor 3a is rectified via the feedback signal transfer switch 52c by the rectification circuit 45, treated by the level shift circuit 44 and becomes the control signal of the oscillator 41. Similarly, in the case where the signal terminal A is H and the signal terminal B is L, the transistor 47 continues electrified, and so, the transfer control relay coil 49 is fed with a current by the transistor 47. Moreover, the motor transfer switches 52a, 52b and the feedback signal transfer switch 52c are worked and so, the ultrasonic motor 3 is supplied with the output from the amplifiers 43a, 43b via the motor transfer switches 52a, 52b and the feedback signal FB2 of this motor 3b is treated via the feedback signal transfer switch 22c by the rectification circuit 45 and the level shift circuit 44. Moreover, in the case where the signal terminals A, B are both H, the transistors 47, 48 continue electrified and so, the switching control relay coils 49, 50 are fed with a current. Moreover, the motor transfer switches 52a, 52b, 53a and 53b and the feedback signal transfer switches 52c, 53c are worked and so, the ultrasonic motor 3c is worked. The feedback signal FB3 of this motor 3c is treated by being supplied for the rectification circuit 45 and the level shift circuit 14 via the feedback signal transfer switches 52c and 53c. The relation between the H–L conditions of the signal terminals A, B and the working or nonworking (O,X) of the ultrasonic motors 3a–3c is shown in FIG. 2.

And the L–H conditions of the signal terminals A, B are decided by the encoder circuit 58k as shown in FIG. 9, depending upon the combination of L and H of the time-division pulse signals S1, S2 and S3. The time-division pulse signals S1, S2 and S3 are generated from the chopper control circuit 57 as the three phase pulse which are shifted by $\frac{1}{3}$ pulse frequency so as to be L or H, as shown in FIG. 10. When the working of the ultrasonic motor 3a finishes working by the air damper reaching the predetermined position, the position signal $P_1$ generates in the position sensor 54. After this position signal is input into the chopper control circuit 27, the pulse signal S1 becomes L. Similarly, the pulse signals S2, S3 also become L after the ultrasonic motors 3b, 3c finish working and the position signals $P_2$, $P_3$ generate in the position sensors 55, 56.

Thus, according to the seventh embodiment, the time-division pulse signal of the signal terminals A, B is controlled by the position sensor and the chopper control circuit so as to generate as far as the desired rotary position of the respective ultrasonic motors. In consequence, one operating circuit can transfer the three ultrasonic motors time-divisionally and operate them individually as if there were three operating circuits.

Furthermore, if the similar circuit is constituted by increasing the motor transfer switches 52a, 52b, 53a and 53b and the feedback signal transfer switches 52c and 53c to the (n−1) stage and providing (n−1) pieces of the transitions 47, 48 and (n−1) pieces of the switching control relay coils 49, 50, the operation system capable of operating to transfer n pieces of the ultrasonic motors can be constituted.

In this way, the operation system of the seventh embodiment has the motor transfer switches 52a, 52b, 53a and 53b at the back step of the amplifiers 43a, 43b. In consequence, there is an advantage that the number of the amplifiers is small.

The eighth embodiment will be explained on the basis of FIG. 11 and FIG. 12.

The operation system of the eighth embodiment, as shown in FIG. 11, has the oscillator 41, the phase shifter 42, the level shift circuit 44 and the rectification circuit 45, as one operation system. The phase of the alternating current signal in the ultrasonic wave region made by the oscillator 41 is shifted electrically by about 90 degrees by the phase shifter 42. The revolving direction transfer switch 46a–46d transfer the output signal of the oscillator 41 and the phase shifter 42 in both normal and reverse directions, depending upon H and L signals input into the signal terminal C. In consequence, the revolving direction of the ultrasonic motors 3a–3c can be transferred. The six motor transfer switches 59a–59f of the fourth embodiment are electric switches and stand between said revolving direction transfer switches 46a–46d and the six amplifiers 43a–43f. The time-division pulse signal S1 from the chopper control circuit 57 is introduced to the control terminal of the motor transfer switches 59a and 59b. The time-division pulse signal S2 is introduced to the control terminal of the motor transfer switches 59c and 59d. The time-division pulse signal S3 is introduced to the control terminal of the motor transfer switches 59e and 59f. The input side of the six motor transfer switches 59a–59f are connected, by twos as a pair, parallel with two output lines of the revolving direction transfer switches 46a–46d respectively. The output side of the motor transfer switches 59a–59f are connected with the input side of the six amplifiers 43a–43f are connected, by twos as a pair, with the ultrasonic motors 3a–3c. The position sensors 54–56 are provided in relation to the output axis of the ultrasonic wave motors 3a–3c respectively, input the position signals P1, P2 and P3 of these position sensors 54–56 into the chopper control circuit 57, judge whether the angle position of the motor axis stands in its predetermined position or not, and control the pulse signals S1–S3.

The feedback signals FB1–FB3 output from the feedback terminals of the ultrasonic motors 3a–3c are introduced to the rectification circuit 45 via the feedback signal transfer switches 60a–60c. The said feedback signals FB1–FB3 are rectified by the rectification circuit 45, treated by the level shift circuit 44 and become the control signal of the oscillator 41. The time-division pulse signals S1–S3 from the chopper control circuit 57 are applied to the control terminal of the feedback signal transfer switch 60a–60c respectively. Further, in FIG. 5, R1–R7 are resistors and VR$_1$, VR$_2$ and VR$_3$ are variable resistors.

The working of the eighth embodiment according to the above constitution will be explained. In the case where the signal applied to the signal terminal C is H, the revolving direction transfer switches 46a and 46c continue electrified. In the case where the pulse signal S1 generation from the chopper control circuit 57 at a different phase, as shown in FIG. 3, is H, the motor transfer switches 59a and 59b continue electrified. In consequence, the alternating current signal of the oscillator 41 is supplied for the amplifier 43b via the revolving direction transfer switch 46c and the motor transfer switch 59b. After it is amplified by the amplifier 43b, it is supplied for the input terminal on the lower side of the ultrasonic motor 3a. Moreover, the output of the phase shifter 42 is supplied for the input terminal on the upper side of the ultrasonic motor 3a via the revolving direction transfer switch 46a, the motor transfer switch 59a and the amplifier 43a. In consequence, the ultrasonic motor 3a rotates in the normal direction. The feedback signal FB1 of this motor 3a is introduced to the feedback signal transfer switch 60a and this switch 60a continues electrified because the pulse signal S1 is H. In consequence, it is treated by the rectification circuit 45 and the level shift circuit 44 and is supplied for the oscillator 41 as the control signal. In the case where the pulse signal S2 is H, the motor transfer switches 59c and 59d continue electrified. In consequence, the signal of the oscillator 41 is supplied for the ultrasonic motor 3b via the revolving direction transfer switch 46c, the motor transfer switch 59d and the amplifier 43d. Moreover, the signal of the phase shifter 42 is supplied for the ultrasonic motor 3b via the revolving direction transfer switch 46a, the motor transfer switch 59c and the amplifier 43c and said motor 3b rotates in the normal direction. Similarly, in the case where the pulse signal S3 is H, the signals of the oscillator 41 and the phase shifter 42 are supplied for the ultrasonic motor 3c and said motor 3c rotates in the normal direction.

Moreover, in the case where the signal input into the signal terminal O is L, the output signal of the NOT circuit 51 becomes H. In consequence, the revolving direction transfer switches 46b and 46d continue electrified and the ultrasonic motor 3a–3c rotate in the reverse direction.

The relation between the time-division pulse signals S1–S3 from the chopper control circuit 57 and the working of the ultrasonic motors 3a–3c is as shown in FIG. 12. In FIG. 12, the pulse signals S1 S3 being L is shown as OV and H, as +Vcc. Moreover, the ultrasonic motors 3a–3c working is shown as (O) and non-working, as (X).

Because the operating system of the eighth embodiment transfers to select the ultrasonic motors 3a–3c in the small signal part, that is, before the amplifiers 43a–43f amplify the signals by the motor transfer switches 59a–59f which are electric switches, it does not need the relay and has an advantage that the whole body of the operating system can be constituted in a small size with IC elements.

As above mentioned, the air damper operating system of vehicle air conditioners works the several ultrasonic motors time-divisionally by one operating circuit and so, the operating system has an excellent effect that individual workings of the several ultrasonic motors can be done by one operating circuit in the same way as the several ultrasonic motors are operated by the several operating circuits.

What is claimed is:

1. An air damper operating system of vehicle air conditioners comprising:
   a single operating circuit operating a plurality of ultrasonic motors;
   said operating circuit containing an oscillator generating an alternating current signal, a phase shifter shifting said alternating current signal and a feedback means controlling a frequency of an alternating current signal of an oscillator by a feedback signal of an ultrasonic motor;

a revolving direction transfer switch means capable of transferring an output signal from said oscillator and phase shifter in both normal and reverse directions in response to an input signal;

a switching supply means containing a motor transfer switch and an amplifier capable of switching output signals of said oscillator and phase shifter via said revolving direction transfer switch means to a plurality of ultrasonic motors so as to supply with;

a feedback signal transfer switch means capable of switching feedback signals from said ultrasonic motors to said feedback means so as to supply with;

position sensors provided for said ultrasonic motors respectively and generating position signals when said ultrasonic motors are rotated to the predetermined positions; and a time-division switching means generating a time-division pulse signal from which said ultrasonic motor starts revolving until said position sensor generates a position signal and working to switch said switching supply means and feedback signal transfer switch means.

* * * * *